(12) United States Patent
Moseman

(10) Patent No.: US 10,783,111 B2
(45) Date of Patent: Sep. 22, 2020

(54) PERIPHERAL MODULE VALIDATION FOR MODULAR DIGITAL OPTICAL GUNSIGHT SYSTEMS

(71) Applicant: Sensors Unlimited, Inc., Princeton, NJ (US)

(72) Inventor: Samuel L. Moseman, Irvine, CA (US)

( * ) Notice: Subject to any disclaimer, the term of this patent is extended or adjusted under 35 U.S.C. 154(b) by 360 days.

(21) Appl. No.: 15/824,988

(22) Filed: Nov. 28, 2017

(65) Prior Publication Data

US 2019/0166174 A1 May 30, 2019

(51) Int. Cl.
*G06F 16/11* (2019.01)
*G06F 13/38* (2006.01)
*H04L 29/06* (2006.01)

(52) U.S. Cl.
CPC .......... *G06F 16/116* (2019.01); *G06F 13/387* (2013.01); *H04L 69/08* (2013.01); *H04L 69/12* (2013.01)

(58) Field of Classification Search
CPC ........ G06F 13/387; G06F 16/116; F41G 1/54; F41G 3/26; F41G 3/32; F41G 5/26
USPC .......... 42/119; 702/35, 85, 108, 127
See application file for complete search history.

(56) References Cited

U.S. PATENT DOCUMENTS

| | | | | |
|---|---|---|---|---|
| 8,963,573 B2* | 2/2015 | Achkir | ............... | H04L 1/241 324/523 |
| 9,366,504 B2* | 6/2016 | Hester | ............... | F41G 3/2694 |
| 9,593,913 B1* | 3/2017 | Wright | ............... | F41G 5/00 |
| 2005/0114710 A1* | 5/2005 | Cornell | ............... | G06F 21/57 726/4 |
| 2011/0030264 A1* | 2/2011 | Davidson | ............... | F41G 1/38 42/122 |
| 2014/0285882 A1* | 9/2014 | Gotz | ............... | F41G 1/38 359/422 |
| 2015/0016817 A1* | 1/2015 | Hara | ............... | H04B 10/0731 398/16 |
| 2017/0010073 A1 | 1/2017 | Downing | | |
| 2017/0097209 A1 | 4/2017 | Portoghese et al. | | |

FOREIGN PATENT DOCUMENTS

| | | | | |
|---|---|---|---|---|
| CN | 105423813 A | * | 3/2016 | ............... F41C 9/00 |
| CN | 106612141 | * | 5/2017 | ............. H04B 10/07 |

* cited by examiner

*Primary Examiner* — Robert Tavlykaev
(74) *Attorney, Agent, or Firm* — Knobbe, Martens, Olson & Bear, LLP

(57) ABSTRACT

A modular digital optical gunsight (MDOG) peripheral module validation device includes an MDOG data connector configured to connect to an MDOG peripheral module and to receive and/or transmit MDOG data in a first format to or from the MDOG peripheral module, a translation module configured to translate the MDOG data in the first format to a second format that is compatible with a personal computer (PC), and a PC data connector configured to connect the validation device to a PC and to receive and/or transmit the MDOG data in the second format to the PC. The translation module can be configured to translate data in the second format to the first format.

18 Claims, 2 Drawing Sheets

PERIPHERAL MODULE VALIDATION FOR MODULAR DIGITAL OPTICAL GUNSIGHT SYSTEMS

BACKGROUND

1. Field

The present disclosure relates to firearm railings, more specifically to modular digital optical gunsights (MDOGs).

2. Description of Related Art

A Modular Digital Optical Gunsight (MDOG) is a next-generation firearm scope/sight system. MDOGs include an optical rail, which allows "modules" peripheral to the main digital processor to be connected. Such rails feature connections for power, RS232 for serial communications, and optical data transmission. However, traditionally, the only way to test and validate modules with such rail systems is to procure the module and test it directly on the sight rail.

Such conventional methods and systems have generally been considered satisfactory for their intended purpose. However, there is still a need in the art for improved testing systems and methods for MDOG's. The present disclosure provides a solution for this need.

SUMMARY

A modular digital optical gunsight (MDOG) peripheral module validation device includes an MDOG data connector configured to connect to an MDOG peripheral module and to receive and/or transmit MDOG data in a first format to or from the MDOG peripheral module, a translation module configured to translate the MDOG data in the first format to a second format that is compatible with a personal computer (PC), and a PC data connector configured to connect the validation device to a PC and to receive and/or transmit the MDOG data in the second format to the PC. The translation module can be configured to translate data in the second format to the first format.

The device can include a power supply for powering the MDOG chip in test. The power supply can be provided through the MDOG data connector, for example, however, any other suitable power supply is contemplated herein.

The first format and/or the second format can include serial communication. The device can further include a deserializer configured to deserialze the data of the first format from the MDOG. The device can further include serializer for transmitting data from the device to at least one of the MDOG and the PC in serial communication.

In certain embodiments, the first format can include RS232. In certain embodiments, the second format can include USB protocol such that the PC connector can include a USB port. Any suitable format for the first format and/or second format is contemplated herein.

The peripheral module can include an optical gunsight, for example. In certain embodiments, the translation module can include a field programmable gate array (FPGA), for example, or any other suitable circuitry.

In accordance with at least one aspect of this disclosure, a method for validating a modular digital optical gunsight (MDOG) peripheral module can include receiving MDOG data at an MDOG peripheral module validation device from an MDOG peripheral module of an MDOG optical rail in a first format via an MDOG data connector, translating the MDOG data in the first format to a second format that is compatible with a personal computer (PC) at a translation module, and transmitting data in the second format to the PC from the MDOG peripheral module validation device via a PC data connector that connects the MDOG peripheral validation device to the PC.

The method can include providing power to the MDOG peripheral module from a power supply. Translating the data from the first format to the second format includes translating from RS232 to Universal Serial Bus (USB) protocol. The method can include deserializing the MDOG data before translating the MDOG data from the first format to the second format. In certain embodiments, the method can include reserializing the data in the second format to before transmitting the data to the PC.

Translating the data from the first format to the second format can include translating from serialized streaming video data to HDMI video format. Translating the data from the first format to the second format can include translating from serialized streaming video data to cameralink video format. Translating the data from the first format to the second format can include translating from serialized streaming video data to USB3 video format.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
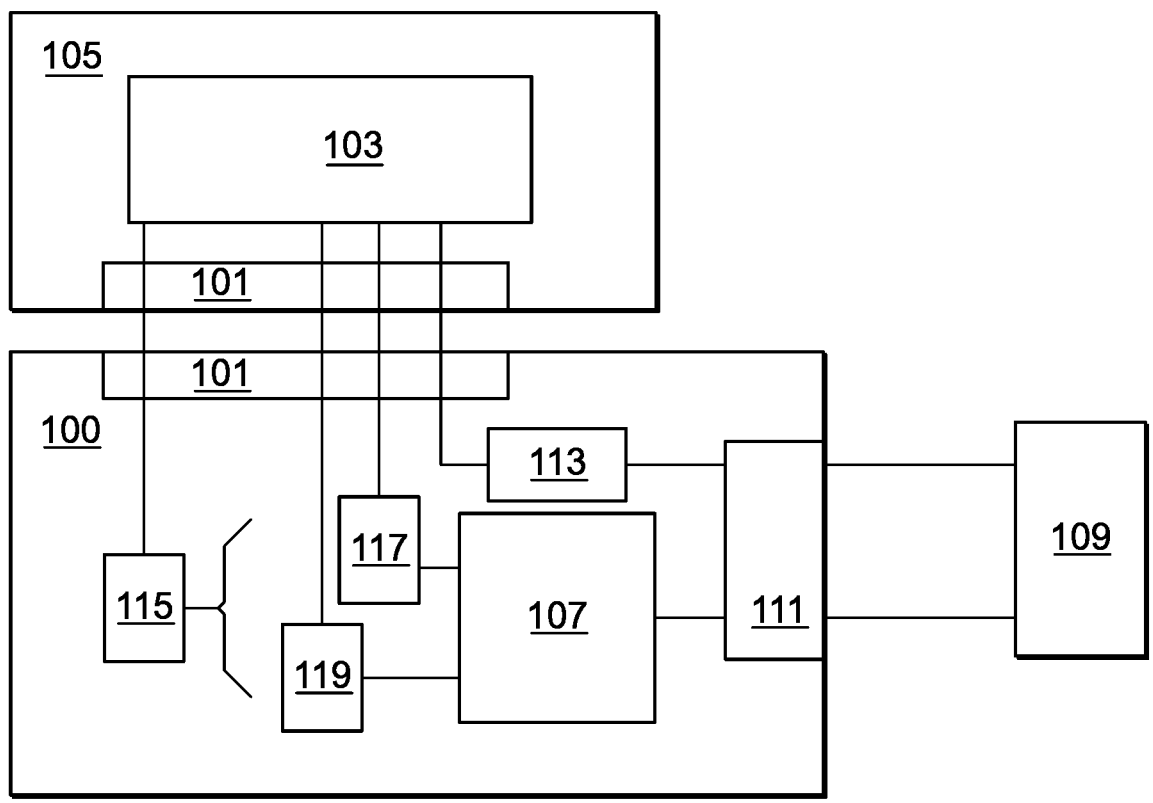
FIG. 1 is a schematic diagram of an embodiment of a device in accordance with this disclosure.
Figure 2:
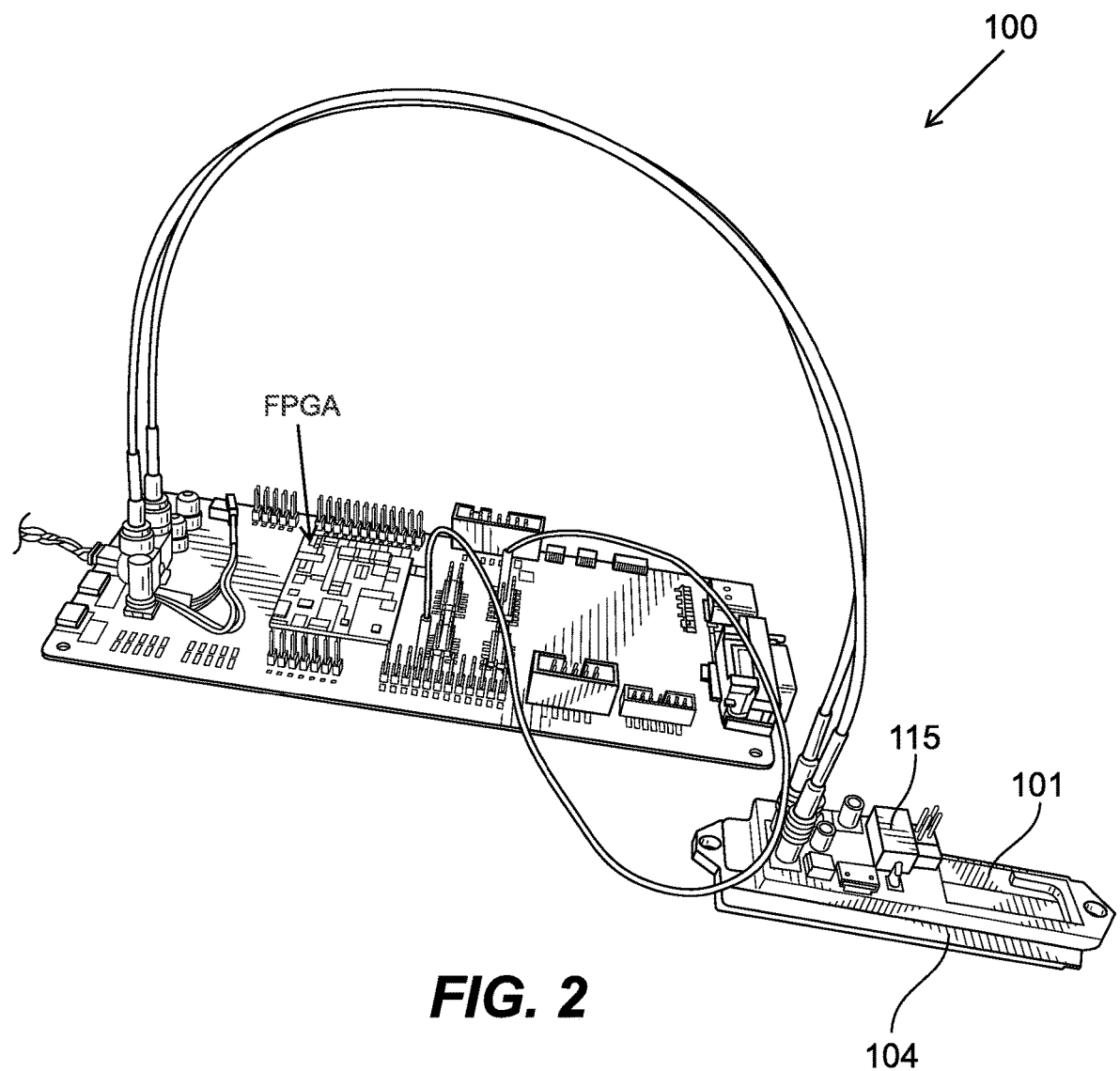
FIG. 2 shows an embodiment of a device in accordance with this disclosure including an optical rail data connector.

Reference will now be made to the drawings wherein like reference numerals identify similar structural features or aspects of the subject disclosure. For purposes of explanation and illustration, and not limitation, an illustrative view of an embodiment of a device in accordance with the disclosure is shown in FIG. 1 and is designated generally by reference character 100. Other embodiments and/or aspects of this disclosure are shown in FIG. 2. The systems and methods described herein can be used to test peripheral modules of a modular digital optical gunsight (MDOG) for use with an MDOG optical rail, which itself can comprise a fiber-optic communication pathway for electrical data, an electrical power connection, and possibly (not necessarily) electrical connections for secondary, tertiary, or any suitable plurality of data paths.

Referring to FIG. 1, an MDOG peripheral module validation device 100 includes an MDOG data connector 101 configured to connect to an MDOG data connector of an MDOG peripheral module 105 and to receive and/or transmit MDOG data in a first format to or from the MDOG peripheral module 105. In certain embodiments, as shown in FIG. 2, the MDOG data connector 101 can include an MDOG optical rail 104, which can include optical and electrical connections for connecting to mating connections on a peripheral module (e.g., a mating rail attached to a gunsight). The peripheral module 105 can comprise at least an MDOG data connector 101 and an electronic data acquisition or processing system 103 (e.g., including any suitable computer hardware and or software) as appreciated by those having ordinary skill in the art.

The device 100 also includes a translation module 107 configured to translate the MDOG data in a first format to a second format (e.g., HDMI) that is compatible with a personal computer (PC) 109 (e.g., for display on a PC). The translation module 107 can be configured to translate data in the second format to the first format. The device 100 may also include secondary, tertiary, or any suitable plurality of data paths and/or translation modules 107, e.g., to the extent of the MDOG connections 101. The device 100 also includes a PC data connector 111 configured to connect the validation device 100 to a PC 109 and to receive and/or transmit the MDOG data in the second format to the PC 109.

In certain embodiments, the device can include a standalone logic module 113 to configure and/or control the MDOG peripheral module 105 without the need of a PC. The device 100 can include a power supply 115 for powering the MDOG peripheral module 105 in test via the MDOG data connector 101 and/or for powering any other electrical components within device 100, for example. The power for the power supply 115 can be provided through the PC data connection 111, for example, however, any other suitable power supply connection scheme is contemplated herein. Additionally or alternatively, power can be supplied directly to the MDOG peripheral module 105 in any suitable manner.

The first format and/or the second format can include serialized data transfer, for example. In such embodiments, the device 100 can further include a deserializer 117 configured to deserialize the data of the first format from the MDOG peripheral module 105. The device can further include serializer 119 for transmitting data from the device 100 or PC 109 to the MDOG peripheral module. In certain embodiments, the deserializer 117 and the serializer 119 can be the same unit, can be integrated within the translation module 107, and/or can each separately provide both serialization and deserialization for either connections 101, 111.

In certain embodiments, the first format can include RS232. In certain embodiments, the second format can include USB protocol such that the PC connector can include a USB port. Any suitable format for the first format and/or second format is contemplated herein.

The peripheral module 105 can include an optical gunsight, for example, or any other suitable device configured to attach to an MDOG optical railing. The translation module 107 can include a field programmable gate array (FPGA), for example, or any other suitable circuitry (e.g., an ASIC). In certain embodiments, the FPGA can include the serializer 119 and/or deserializer 117. Moreover, any suitable modules as described herein above can be integrated together and/or separate in any suitable manner as appreciated by those having ordinary skill in the art. Any suitable modules as described herein can include any suitable hardware (e.g., circuitry) and/or software (e.g., computer code) to perform their functions as appreciated by those having ordinary skill in the art.

In accordance with at least one aspect of this disclosure, a method for validating a modular digital optical gunsight (MDOG) peripheral module can include receiving MDOG data at an MDOG peripheral module validation device from an MDOG peripheral module of an MDOG optical rail in a first format via an MDOG data connector, translating the MDOG data in the first format to a second format that is compatible with a personal computer (PC) at a translation module, and transmitting data in the second format to the PC from the MDOG peripheral module validation device via a PC data connector that connects the MDOG peripheral validation device to the PC.

The method can include providing power to the MDOG peripheral module from a power supply. Translating the data from the first format to the second format includes translating from RS232 to Universal Serial Bus (USB) protocol.

The method can include deserializing the MDOG data before translating the MDOG data from the first format to the second format. In certain embodiments, the method can include reserializing the data in the second format to before transmitting the data to the PC.

Translating the data from the first format to the second format can include translating from serialized streaming video data to HDMI video format. Translating the data from the first format to the second format can include translating from serialized streaming video data to cameralink video format. Translating the data from the first format to the second format can include translating from serialized streaming video data to USB3 video format.

As appreciated by those having ordinary skill in the art, deserializing is not necessary if the peripheral module 105 does not create certain data, e.g., imagery data like an optical device. Referring to FIG. 2, an embodiment of a device 100 having an optical rail 104 as a data connector is shown. While portions of device 100 are shown as external from an MDOG optical rail 104, it is contemplated that embodiments of a device 100 as described herein can be sized and attached to the MDOG optical rail 104 to form the test apparatus.

Embodiments include an electrical system connected to the "master" side of the optical rail of the MDOG. Embodiments can supply power to the MDOG optical rail and/or peripheral module, communicate to them, e.g., via RS232 and can report peripheral module status to a PC. Embodiments can receive or transmit data via the optical connection from or to the simulated peripheral (e.g., the simulation module). Embodiments can be used as a testing apparatus for the development of any MDOG peripheral. Any suitable hardware components can be included. For example, certain embodiments include a microcontroller (e.g., embodied in an FPGA), a power supply, a current monitor, at least one RS232 port, a second RS232 port or a USB (or other common communication protocol) port, a connection to the optical rail 105, de-serializing integrated circuits for incoming optical rail data, serializing IC's for outgoing optical rail data, and/or an FPGA for interpreting for outputting that data. Certain embodiments can also include at least one of a USB3, Ethernet, or a cameralink output from FPGA for video transmission.

As will be appreciated by those skilled in the art, aspects of the present disclosure may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described above with reference to flowchart illustrations and/or block diagrams of methods, apparatus (systems) and computer program products according to embodiments of the invention. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Any suitable combination(s) of any disclosed embodiments and/or any suitable portion(s) thereof is contemplated therein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A modular digital optical gunsight (MDOG) peripheral module validation device, comprising:
   an MDOG data connector configured to be removably connected to an MDOG peripheral module and to receive and/or transmit MDOG data in a first format to and/or from the MDOG peripheral module, the MDOG connector being physically separate from the peripheral module, the MDOG data connector configured to receive electrical and optical signals from the peripheral module for validation thereof;
   a translation module configured to translate the MDOG data in the first format to a second format that is compatible with a personal computer (PC); and
   a PC data connector configured to connect the validation device to a PC and to receive and/or transmit the MDOG data in the second format to the PC.

2. The device of claim 1, further comprising a power supply for powering the MDOG peripheral module in test.

3. The device of claim 2, wherein power from the power supply is provided through the MDOG data connector.

4. The device of claim 1, wherein the first format includes serialized digital data, wherein the device further includes a deserializer configured to deserialize the data of the first format from the MDOG.

5. The device of claim 4, further comprising a serializer for transmitting data from the device to at least one of the MDOG and the PC in serial communication.

6. The device of claim 4, wherein the first format includes RS232 or USB.

7. The device of claim 1, wherein the PC connector can include a USB port or HDMI port or Cameralink port.

8. The device of claim 1, wherein the peripheral module is an optical gunsight.

9. The device of claim 1, wherein the translation module includes a field programmable gate array (FPGA).

10. The device of claim 1, wherein the translation module is configured to translate data in the second format to the first format.

11. A method for validating a modular digital optical gunsight (MDOG) peripheral module, comprising:

receiving MDOG data at an MDOG peripheral module validation device from an MDOG peripheral module of an MDOG optical rail in a first format via an MDOG data connector, the MDOG data transmitted by optical and electrical signals, and the MDOG connector being physically separate from the peripheral module;

translating the MDOG data in the first format to a second format that is compatible with a personal computer (PC) at a translation module;

transmitting data in the second format to the PC from the MDOG peripheral module validation device via a PC data connector that connects the MDOG peripheral validation device to the PC; and processing the MDOG data and validating the MDOG peripheral module.

12. The method of claim 11, further comprising providing power to the MDOG peripheral module from a power supply.

13. The method of claim 11, further comprising deserializing the MDOG data before translating the MDOG data from the first format to the second format.

14. The method of claim 13, further comprising reserializing the data in the second format to before transmitting the data to the PC.

15. The method of claim 11, wherein translating the data from the first format to the second format includes translating from RS232 to Universal Serial Bus (USB) protocol.

16. The method of claim 11, wherein translating the data from the first format to the second format includes translating from serialized streaming video data to HDMI video format.

17. The method of claim 11, wherein translating the data from the first format to the second format includes translating from serialized streaming video data to cameralink video format.

18. The method of claim 11, wherein translating the data from the first format to the second format includes translating from serialized streaming video data to USB3 video format.

* * * * *